US011386228B2

(12) United States Patent
McErlean

(10) Patent No.: US 11,386,228 B2
(45) Date of Patent: Jul. 12, 2022

(54) REAL-TIME SESSION-BASED ANONYMIZATION AND BLURRING OF HIGH-RESOLUTION GPS DATA

(71) Applicant: GM Global Technology Operations LLC, Detroit, MI (US)

(72) Inventor: Donal B. McErlean, Ennis (IE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 576 days.

(21) Appl. No.: 16/430,927

(22) Filed: Jun. 4, 2019

(65) Prior Publication Data

US 2020/0387632 A1 Dec. 10, 2020

(51) Int. Cl.
*G06F 21/62* (2013.01)
*H04L 9/40* (2022.01)
*G01S 19/42* (2010.01)
*G01S 19/24* (2010.01)

(52) U.S. Cl.
CPC .......... *G06F 21/6254* (2013.01); *G01S 19/24* (2013.01); *G01S 19/42* (2013.01); *H04L 63/0421* (2013.01)

(58) Field of Classification Search
CPC ......... H04W 4/029; H04W 4/44; H04W 4/46; G06F 21/6254; G01S 19/24; G01S 19/42; H04L 63/0421
See application file for complete search history.

(56) References Cited

U.S. PATENT DOCUMENTS

| 2001/0028350 A1* | 10/2001 | Matsuoka | G01C 21/3635 345/427 |
| 2010/0232404 A1* | 9/2010 | Chen | H04W 28/0226 370/338 |
| 2016/0381596 A1* | 12/2016 | Hu | H04B 7/022 370/236 |
| 2017/0188290 A1* | 6/2017 | Hayee | H04W 40/20 |
| 2017/0236342 A1* | 8/2017 | Mattsson | G07C 9/21 701/32.5 |
| 2018/0043976 A1* | 2/2018 | Nakamoto | H04W 4/024 |
| 2018/0260822 A1* | 9/2018 | Wells | G06N 5/02 |
| 2019/0205797 A1* | 7/2019 | Sakurada | G06Q 10/083 |

(Continued)

*Primary Examiner* — Jeremy S Duffield
*Assistant Examiner* — Andrew Suh
(74) *Attorney, Agent, or Firm* — Vivacqua Crane PLLC

(57) ABSTRACT

A system for anonymizing motor vehicle position information includes a global positioning system (GPS) module disposed within a host vehicle, a control module disposed within the host vehicle and in electronic communication with the GPS module. The control module executes a control logic for collecting real-time host vehicle telemetry data packets from the GPS module, and a control logic for continuously wirelessly communicating the real-time host vehicle telemetry data packets. A remote end-point is in wireless electronic communication with the control module, and executes end-point control logic that continuously receives the real-time host vehicle telemetry data packets from the control module, performs session-based anonymization of the real-time host vehicle telemetry data packets, performs distance-based start location and end location blurring of host vehicle position, writes the real-time host vehicle telemetry data packets to a persistent database once the anonymization and blurring have been executed.

15 Claims, 4 Drawing Sheets

(56) References Cited

U.S. PATENT DOCUMENTS

2020/0313908 A1* 10/2020 Mondello ............ G05D 1/0022
2020/0379122 A1* 12/2020 Tontiruttananon .... G01S 19/215
2021/0208282 A1*  7/2021 Hamaguchi .......... G08G 1/0133

* cited by examiner

REAL-TIME SESSION-BASED ANONYMIZATION AND BLURRING OF HIGH-RESOLUTION GPS DATA

INTRODUCTION

The present disclosure relates to navigation systems for a motor vehicle. More specifically, the present disclosure relates to data privacy of high-speed vehicle telemetry (NSVT) data storage and usage for motor vehicles.

Typical motor vehicles utilize global position system (GPS) technology to assist operators in determining trip routes from starting points to destinations. Such GPS usage typically requires a GPS module or chip mounted to the motor vehicle and in wireless communication with infrastructure, such as one or more global positioning satellites. Position information is acquired by the GPS module of a host vehicle based on communications with the global positioning satellites and displayed to the operator to assist the operator in route selection. Additional information may be collected by the GPS module within the host vehicle and relayed wirelessly to a data storage location external to and separate from the host vehicle for usage in a variety of route optimization algorithms. To effectively and efficiently make use of route data collected from the host vehicle by the host vehicle's GPS module, the route optimization data is often combined with and/or analyzed in conjunction with route data from other client vehicles in communication with the same GPS network.

Accordingly, while current GPS systems operate for their intended purpose, there is a need for new and improved systems and methods of GPS route optimization that can protect the privacy of each user on the system while providing high-resolution GPS data and real-time route data.

SUMMARY

According to an aspect of the present disclosure, a system for anonymizing motor vehicle position information includes a global positioning system (GPS) module disposed within a host vehicle. The system further includes a control module disposed within the host vehicle and in electronic communication with the GPS module, the control module having a memory for storing control logic and a processor configured to execute the control logic. The control logic includes a first control logic for collecting real-time host vehicle telemetry data packets from the GPS module, and a second control logic for continuously wirelessly communicating the real-time host vehicle telemetry data packets. The system further includes a remote end-point in wireless electronic communication with the control module, the remote end-point having a memory for storing end-point control logic and a processor configured to execute the end-point control logic. The end-point control logic includes a first end-point control logic for continuously receiving the real-time host vehicle telemetry data packets from the control module, and a second end-point control logic for performing session-based anonymization of the real-time host vehicle telemetry data packets. The end-point logic further includes a third end-point control logic for performing distance-based start location and end location blurring of host vehicle position, and a fourth end-point control logic for writing the real-time host vehicle telemetry data packets to a persistent database once the second end-point control logic and the third end-point control logic have been executed.

In another aspect of the present disclosure the second control logic further includes a control logic for continuously communicating the real-time host vehicle telemetry data packets at intervals of approximately 3 seconds.

In yet another aspect of the present disclosure first end-point control logic further includes a control logic for classifying the real-time host vehicle telemetry data packets into: start of trip, end of trip, and latest value of current trip classifications.

In still another aspect of the present disclosure the real-time host vehicle telemetry data packets further include a host vehicle identification number (VIN), a host vehicle speed, a host vehicle bearing, a host vehicle altitude, and a host vehicle ignition position.

In still another aspect of the present disclosure the second end-point control logic further includes a control logic for removing the host vehicle VIN and replacing the VIN with a unique session identifier (ID) for a current host vehicle trip, and a control logic for generating keys that associate the host vehicle with the unique session ID for the current host vehicle trip. The second end-point control logic further includes a control logic for associating new real-time host vehicle telemetry data packets with the unique session ID for the current host vehicle trip.

In still another aspect of the present disclosure the second end-point control logic further includes a control logic for deleting keys associating the real-time host vehicle telemetry data packets with the unique session ID for the current host vehicle trip after a predetermined period of time; and a control logic for expunging the session ID after a key-off packet is received or the predetermined period of time has elapsed.

In still another aspect of the present disclosure the end-point control logic further includes a fifth end-point control logic for writing the real-time host vehicle telemetry data packets to an end-point in-memory cache with the unique session ID as an indexed field; and for deleting real-time host vehicle telemetry data packets from the in-memory cache once a current trip has ended.

In still another aspect of the present disclosure the end-point control logic further includes a sixth end-point control logic for querying all of the real-time host vehicle telemetry data packets for the unique session ID, and a seventh end-point control logic for sequentially ordering all of the real-time host vehicle telemetry data packets for the unique session ID based on time stamps.

In still another aspect of the present disclosure the third end-point control logic further includes control logic for determining a start location based on a first in time of the real-time host vehicle telemetry data packets, and for determining an end location based on a last in time of the real-time host vehicle telemetry data packets. The third end-point control logic further includes control logic for checking all of the real-time host vehicle telemetry data packets to determine a current distance from the start location, and control logic for checking all of the real-time host vehicle telemetry data packets to determine a current distance from the end location.

In still another aspect of the present disclosure the third end-point control logic further includes a control logic for decreasing a precision of location information in each of the real-time host vehicle telemetry data packets within a first predetermined radial distance of the start location, and a control logic for decreasing a precision of location information in each of the real-time host vehicle telemetry data packets within a first predetermined radial distance of the end location. The third end-point control logic further includes a control logic for decreasing a precision of location information in each of the real-time host vehicle telemetry data packets within a second predetermined radial distance of the start location, and a control logic for decreasing a precision of location information in each of the real-time host vehicle telemetry data packets within a second predetermined radial distance of the end location. The first predetermined radial distance is smaller than the second predetermined radial distance.

In still another aspect of the present disclosure the third end-point control logic further includes control logic for decreasing GPS precision by a predetermined quantity of numerical location digits or decimal places. The precision of location information within the second predetermined radial distance is greater than the precision of location information within the first predetermined radial distance.

In still another aspect of the present disclosure a method for anonymizing motor vehicle position information includes collecting real-time host vehicle telemetry data packets from a global positioning system (GPS) module disposed within a host vehicle, and utilizing a control module disposed within the host vehicle and in electronic communication with the GPS module, the control module having a memory for storing control logic and a processor configured to execute the control logic. The method further includes collecting real-time host vehicle telemetry data packets from the GPS module, and continuously wirelessly communicating the real-time host vehicle telemetry data packets. The method further includes utilizing a remote end-point in wireless electronic communication with the control module, the remote end-point having a memory for storing end-point control logic and a processor configured to execute the end-point control logic. The method further includes continuously receiving the real-time host vehicle telemetry data packets from the control module, performing session-based anonymization of the real-time host vehicle telemetry data packets, and performing distance-based start location and end location blurring of host vehicle position. The method further includes writing the real-time host vehicle telemetry data packets to a persistent database once the session-based anonymization of the real-time host vehicle telemetry data packets has been performed, and once the distance-based start location and end location blurring has been performed.

In still another aspect of the present disclosure the method further includes continuously communicating the real-time host vehicle telemetry data packets at intervals of approximately 3 seconds.

In still another aspect of the present disclosure the method further includes classifying the real-time host vehicle telemetry data packets into: start of trip, end of trip, and latest value of current trip classifications.

In still another aspect of the present collecting real-time host vehicle telemetry data packets further includes collecting a host vehicle identification number (VIN), collecting a host vehicle speed, collecting a host vehicle bearing, collecting a host vehicle altitude, and collecting a host vehicle ignition position.

In still another aspect of the present disclosure performing session-based anonymization of the real-time host vehicle telemetry data packets further includes removing the host vehicle VIN and replacing the VIN with a unique session identifier (ID) for a current host vehicle trip, generating keys that associate the host vehicle with the unique session ID for the current host vehicle trip, and associating new real-time host vehicle telemetry data packets with the unique session ID for the current host vehicle trip.

In still another aspect of the present disclosure performing session-based anonymization of the real-time host vehicle telemetry data packets further includes deleting keys associating the real-time host vehicle telemetry data packets with the unique session ID for the current host vehicle trip after a predetermined period of time or after a key-off packet has been received. Performing session-based anonymization further includes writing the real-time host vehicle telemetry data packets to an end-point in-memory cache with the unique session ID as an indexed field, and deleting real-time host vehicle telemetry data packets from the in-memory cache once a current trip has ended.

In still another aspect of the present disclosure the method further includes querying all of the real-time host vehicle telemetry data packets for the unique session ID, sequentially ordering all of the real-time host vehicle telemetry data packets for the unique session ID based on time stamps, and determining a start location based on a first in time of the real-time host vehicle telemetry data packets, and for determining an end location based on a last in time of the real-time host vehicle telemetry data packets. The method further includes checking all of the real-time host vehicle telemetry data packets to determine a current distance from the start location, checking all of the real-time host vehicle telemetry data packets to determine a current distance from the end location.

In still another aspect of the present disclosure the method further includes decreasing a precision of location information in each of the real-time host vehicle telemetry data packets when the distance from the start location is within a first predetermined radial distance of the start location, and decreasing a precision of location information in each of the real-time host vehicle telemetry data packets when the distance from the end location is within the first predetermined radial distance of the end location. The method further includes decreasing a precision of location information in each of the real-time host vehicle telemetry data packets when the distance from the start location is within a second predetermined radial distance of the start location, and decreasing a precision of location information in each of the real-time host vehicle telemetry data packets when the distance from the end location is within the second predetermined radial distance of the end location. The first predetermined radial distance is smaller than the second predetermined radial distance. Decreasing a precision of location information in each of the host vehicle telemetry data packets within the first predetermined radial distance and within the second predetermined radial distance further includes decreasing GPS precision by a predetermined quantity of numerical location digits or decimal places. The precision of location information within the second predetermined radial distance is greater than the precision of location information within the first predetermined radial distance.

In still another aspect of the present disclosure a method for anonymizing motor vehicle position information includes collecting real-time host vehicle telemetry data packets, including collecting a host vehicle identification number (VIN) from a global positioning system (GPS) module disposed within a host vehicle. The method further includes utilizing a control module disposed within the host vehicle and in electronic communication with the GPS module, the control module having a memory for storing control logic and a processor configured to execute the control logic. The method further includes continuously wirelessly communicating the real-time host vehicle telemetry data packets, and utilizing a remote end-point in wireless communication with the control module, the remote end-point continuously receiving the real-time host vehicle telemetry data packets from the control module, the remote end-point having a memory for storing end-point control logic and a processor configured to execute the end-point control logic. The method further includes performing session-based anonymization of the real-time host vehicle telemetry data packets, including: removing the host vehicle VIN and replacing the VIN with a unique session identifier (ID) for a current host vehicle trip; associating new host vehicle telemetry data packets with the unique session ID for the current host vehicle trip; and deleting keys associating the host vehicle telemetry data packets with the unique session ID for the current host vehicle trip after a predetermined period of time or after a key-off packet has been received. The method further includes writing the host vehicle telemetry data packets to an end-point in-memory cache with the unique session ID as an indexed field; and performing distance-based start location and end location blurring of host vehicle position, including: querying all of the host vehicle telemetry data packets for the unique session ID; sequentially ordering all of the host vehicle telemetry data packets for the unique session ID based on time stamps, checking all of the data packets to determine a distance from a first in time of the host vehicle telemetry data packets, and checking all of the data packets to determine a distance from a last in time of the host vehicle telemetry data packets. The method further includes decreasing a precision of location information in each of the host vehicle telemetry data packets within a first predetermined radial distance of a location of the first in time of the host vehicle telemetry data packets by decreasing GPS precision by a predetermined quantity of numerical location digits or decimal places, and deleting real-time host vehicle telemetry data packets from the in-memory cache once a current trip has ended. Checking all of the data packets to determine a distance from a last in time of the host vehicle telemetry data packets further includes decreasing a precision of location information in each of the host vehicle telemetry data packets within a second predetermined radial distance of a location of the last in time of the host vehicle telemetry data packets by decreasing GPS precision by a predetermined quantity of numerical location digits or decimal places. The precision of location information within the second predetermined radial distance is greater than the precision of location information within the first predetermined radial distance.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
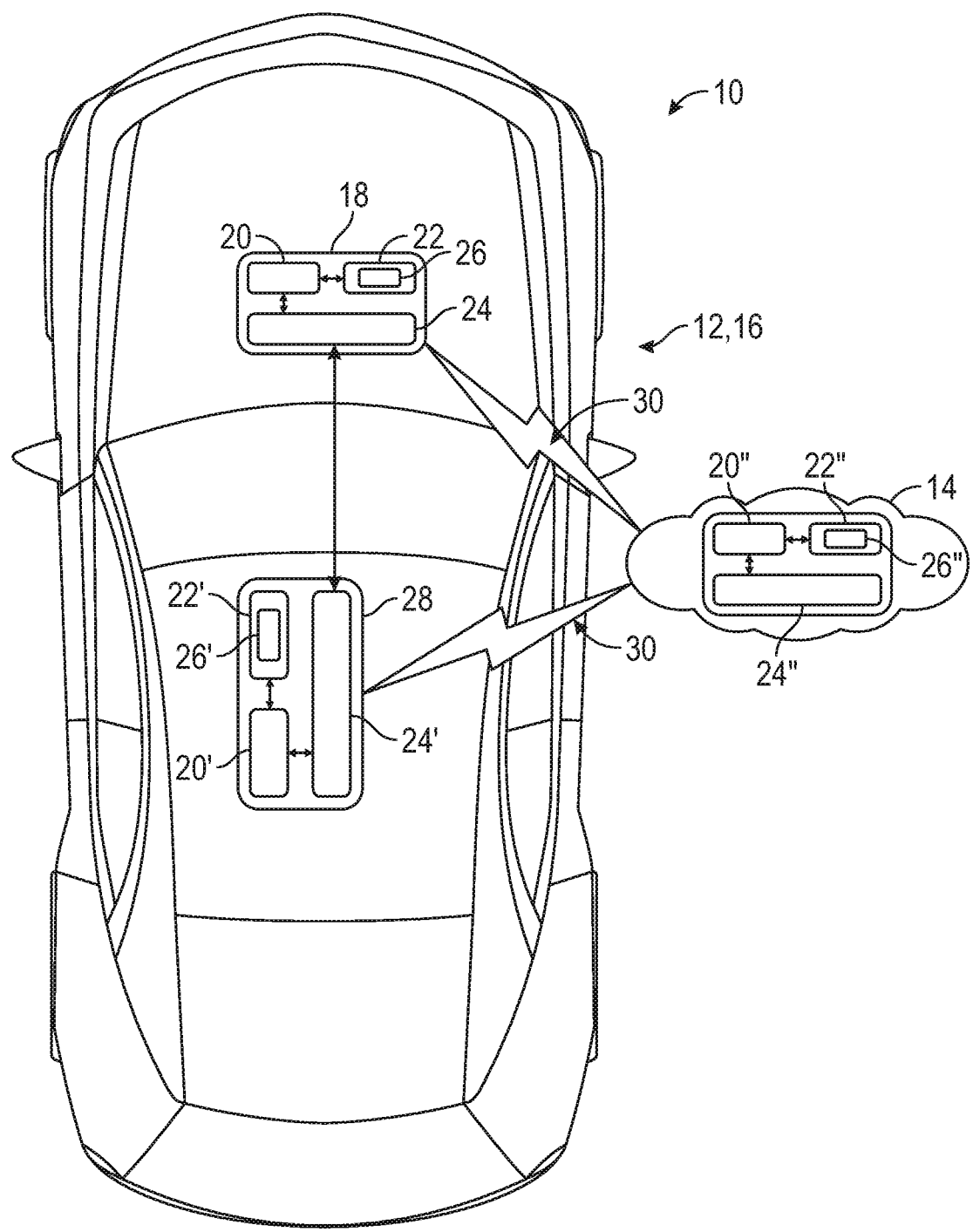
FIG. 1 is a schematic view of system components for real-time session-based anonymization blurring of high resolution GPS data according to an aspect of the present disclosure.

Referring to FIG. 1, a system for anonymizing motor vehicle position information is shown and indicated generally by reference number 10. The system 10 operates through a several components located both locally on a host 12 and in a remote end-point 14 such as a cloud-based storage and computation system like a private cloud, Azure®, Amazon AWS®, or the like. The host 12 may be any of a variety of different devices, such as a cellular phone, a laptop computer, a motor vehicle, an aircraft, a watercraft, or any other global positioning system (GPS) enabled device without departing from the scope or intent of the present disclosure. For ease of understanding, the following description will focus on GPS-enabled motor vehicles hereinafter known as host vehicles 16.

A GPS module 18 is disposed within the host vehicle 16. The GPS module 18 is a non-generalized, electronic control device having a preprogrammed digital computer or processor 20, a memory or non-transitory computer readable medium 22 used to store data such as control logic, software applications, instructions, computer code, data, lookup tables, etc., and a transceiver or input/output ports or peripherals 24. The memory 22 includes any type of computer readable medium capable of being accessed by a computer, such as a read only memory (ROM), a random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium also includes media where data can be permanently stored and media where data can be stored and later overwritten, such as a rewritable optical disc or an erasable memory device. Computer code includes any type of program code, including source code, object code, and executable code. The processor 20 is configured to execute the code, object code, and executable code. The processor 20 is configured to execute the code or instructions. Where the host 12 is a host vehicle 16, the GPS module 18 may be configured to wirelessly communicate with a remote end-point 14 using Wi-Fi protocols under IEEE 802.11x, or the like.

The GPS module 18 further includes one or more applications 26. An application 26 is a software program configured to perform a specific function or set of functions. The application 26 may include one or more computer programs, software components, sets of instructions, procedures, functions, objects, classes, instances, related data, or a portion thereof adapted for implementation in a suitable computer readable program code. The applications 26 may be stored within the memory 22 of the GPS module 18 or in additional or separate memory. Examples of the applications 26 include audio or video streaming services, games, browsers, social media, or the like.

The GPS module 18 is in wireless communication with one or more global positioning satellites (not specifically shown) in orbit around the Earth. The GPS module 18 is mounted at a known location within the host vehicle 16, and by communicating with the one or more global positioning satellites, determines its own position relative to the satellites and the Earth. More generally, the GPS module 18 determines a variety of host vehicle 16 telemetry parameters relating to the host vehicle 16. The GPS module 18 is in electronic communication with a control module 28 disposed within the host vehicle 16. The electronic communication may be wired, wireless, or the like without departing from the scope or intent of the present disclosure.

The control module 28, like the GPS module 18 is composed of several sub-components. In the drawings, like components are indicated by like reference numbers. Accordingly, the control module 28 is a non-generalized, electronic control device having a preprogrammed digital computer or processor 20', a memory or non-transitory computer readable medium 22' used to store data such as control logic, software applications, instructions, computer code, data, lookup tables, etc., and a transceiver or input/output ports or peripherals 24'. The memory 22' includes any type of computer readable medium capable of being accessed by a computer, such as a read only memory (ROM), a random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium also includes media where data can be permanently stored and media where data can be stored and later overwritten, such as a rewritable optical disc or an erasable memory device. Computer code includes any type of program code, including source code, object code, and executable code. The processor 20' is configured to execute the code, object code, and executable code. The processor 20' is configured to execute the code or instructions. Where the host 12 is a host vehicle 16, the control module 28 may be configured to wirelessly communicate with a remote end-point 14 using Wi-Fi protocols under IEEE 802.11x, or the like.

The control module 28 further includes one or more applications 26' as described above with respect to the GPS module 18. The application 26' may include one or more computer programs, software components, sets of instructions, procedures, functions, objects, classes, instances, related data, or a portion thereof adapted for implementation in a suitable computer readable program code. The applications 26' may be stored within the memory 22' or in additional or separate memory of the control module 28. Examples of the applications 26' include audio or video streaming services, games, browsers, social media, or the like.

The remote end-point 14 is in wireless electronic communication with the control module 28. Like each of the control module 28 and the GPS module 18, the remote end-point 14 is a non-generalized, electronic control device having a preprogrammed digital computer or processor 20", a memory or non-transitory computer readable medium 22" used to store data such as control logic, software applications, instructions, computer code, data, lookup tables, etc., and a transceiver or input/output ports or peripherals 24". The memory 22" includes any type of computer readable medium capable of being accessed by a computer, such as a read only memory (ROM), a random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium also includes media where data can be permanently stored and media where data can be stored and later overwritten, such as a rewritable optical disc or an erasable memory device. Computer code includes any type of program code, including source code, object code, and executable code. The processor 20" is configured to execute the code, object code, and executable code. The processor 20" is configured to execute the code or instructions. Where the host 12 is a host vehicle 16, the remote end-point 14 may be configured to wirelessly communicate with the control module 28 and/or the GPS module 18 using Wi-Fi protocols under IEEE 802.11x, or the like.

Figure 2:
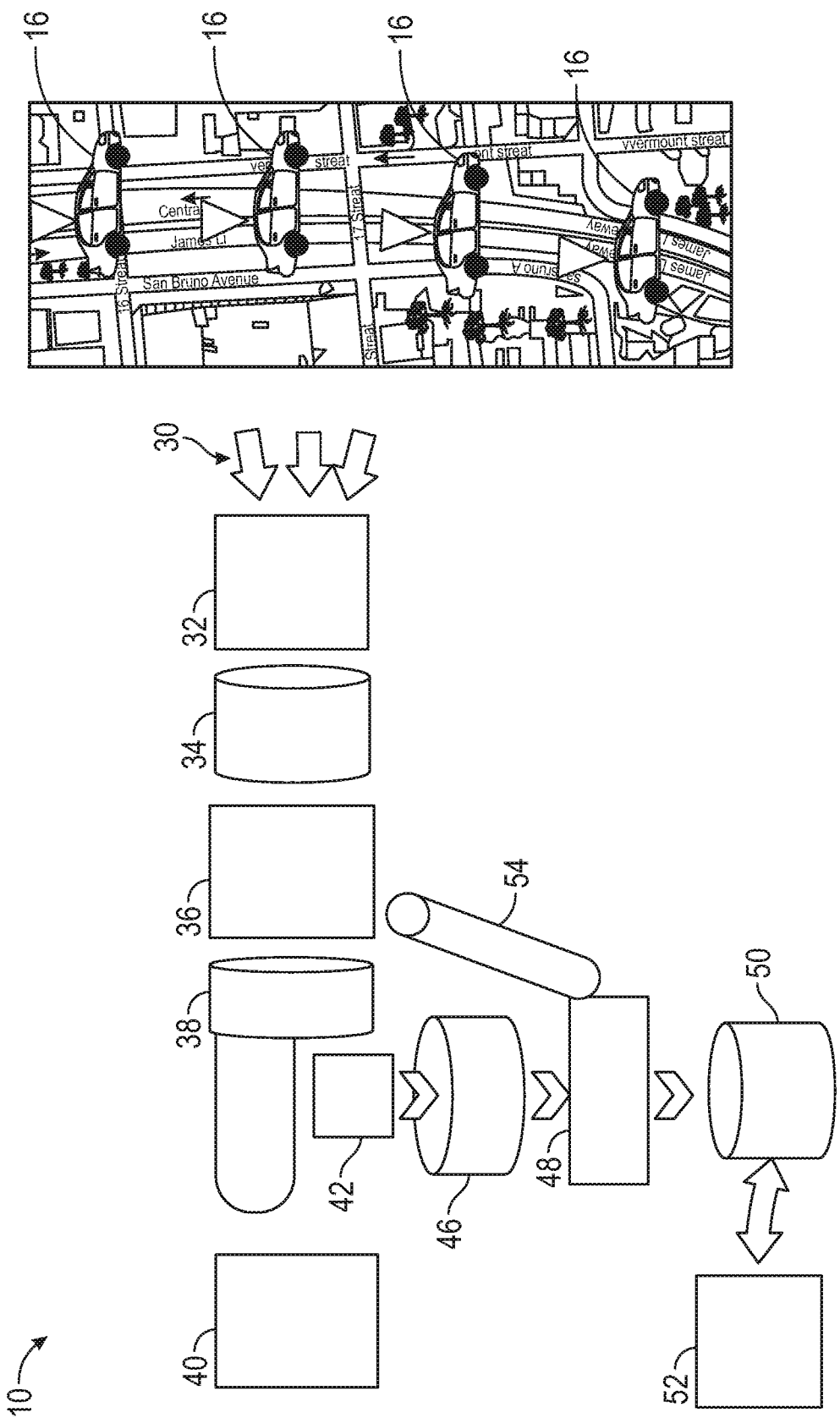
FIG. 2 is a schematic view of the operation of a system for real-time session-based anonymization and blurring of high resolution GPS data according to an aspect of the present disclosure.

Turning now to FIG. 2, and with continuing reference to FIG. 1, the applications 26, 26', 26" are shown in additional detail. Specifically, the applications 26, 26', 26" include a series of control logic instructions executed or run by the processor 20, 20', 20". In several aspects, a first control logic collects real-time host vehicle telemetry data packets 30 from the GPS module 18. The real-time host vehicle telemetry data packets 30 may include any of a variety of vehicle telemetry parameters, including but not limited to: a host vehicle 16 vehicle identification number (VIN), a host vehicle 16 speed; a host vehicle 16 bearing or heading; a host vehicle 16 altitude; and a host vehicle ignition position. In several aspects, real-time is a term of art that would be understood by a person having ordinary skill in the art, but generally should be understood to indicate "live" or "at the current moment in time". Intervals between real-time communications may vary substantially from platform to platform and/or from application to application. In the example of real-time communications regarding GPS communications to and from a host vehicle 16, intervals between individual GPS telemetry broadcasts from the host vehicle 16 are optimized to provide appropriate data granularity while satisfying computational time requirements of a given application. The intervals of one example are between about 0 seconds and about 10 seconds. In another example, the intervals are between about 3 seconds and about 5 seconds. In a further example, the intervals between GPS telemetry broadcasts are approximately 3 seconds. The term "about" with respect to the length of the intervals should be understood to mean + or −0.5 seconds.

The first control logic also classifies the real-time host vehicle telemetry data packets 30 into: start of trip, end of trip, and latest value of current trip classifications. In several aspects, the start of trip vehicle telemetry data packet is identified by way of a so-called, "key-on packet." The key-on packet is sent from an ignition (not specifically shown) of the host vehicle 16 to the control module 28 when an operator of the host vehicle 16 turns on the ignition of the host vehicle 16. The end of trip vehicle telemetry data packet is identified by way of a "key-off packet." The key-off packet is sent from the ignition of the host vehicle 16 to the control module 28 when the host vehicle 16 operator turns the ignition of the host vehicle 16 to an off position. The latest value of current trip classifications packets are categorized as "normal packets" by the control module 28. In several aspects, each of the key-on, key-off, and normal packets are further classified by time offset from a last generated or received vehicle telemetry data packet.

A second control logic causes the control module 28 to continuously wirelessly communicate the real-time host vehicle telemetry data packets 30 to the remote end-point 14. The term "continuously" should be understood to mean, that the real-time host vehicle telemetry data packets 30 are communicated regularly at a predetermined time interval as described above. Furthermore, the data packets 30 are communicated for the duration during which the ignition of the host vehicle 16 is in the on position.

As described above, the remote end-point 14 is in wireless electronic communication with the control module 28. The remote end-point may also be in direct wireless electronic communication with the GPS module 18 as well. The processor 20" of the remote end-point executes a series of programmatic control logic instructions. The processor 20" runs or executes a first end-point control logic 32 that continuously receives the real-time host vehicle telemetry data packets 30 communicated from the control module 28. The real-time host vehicle telemetry data packets 30 are encoded or encrypted by the host vehicle 16 to ensure data privacy, and are received by the remote end-point 14 as binary data, machine code, or the like. The first end point control logic 32 then decrypts and/or decodes the real-time host vehicle telemetry data packets 30 and generates a decrypted packet 34 including the VIN.

In order to utilize host vehicle 16 telemetry data without compromising the specific locations of a particular vehicle, or a particular operator, the processor 20" subsequently runs or executes a second end-point control logic or session anonymizer 36 that performs session-based anonymization of the real-time host vehicle telemetry data packets 30. More specifically, the session anonymizer 36 removes the host vehicle 16 VIN and replaces the VIN with a unique session identifier (ID) for the host vehicle 16 during a current host vehicle 16 trip. The session ID is created through random number generation, or other like methods. As new vehicle telemetry data packets 30 are received by the remote end-point 14, the new data packets 30 from a particular host vehicle 16 on a current host vehicle 16 trip are associated with the session ID for that host vehicle 16 during the current trip. In several aspects, the session anonymizer 36 is a lookup table populated that can be used to cross-reference host vehicle 16 VINs with session IDs.

The session anonymizer 36 publishes the vehicle telemetry data packets 30 with the unique session ID on a queue 38 with the session ID as a key, and the telemetry data within the data packet as a value for that key. The queue 38 is available for real-time in-memory analysis applications 40, such as real-time road or traffic condition analysis. In several aspects, the queue 38 is a publish/subscribe, or pub/sub queue 38. Pub/sub messaging is a form of asynchronous service-to-service communication used in serverless and microservices architecture. In a pub/sub model, any message published to the queue 38 is immediately received by all of the subscribers to the queue 38. In one example, the pub/sub queue 38 allows all of the host vehicles 16 on a given stretch of road and in communication with the remote end-point the ability to receive traffic condition messages pertinent to the location of each of the host vehicles 16. A single remote end-point 14 may be in communication with a very large quantity of different host vehicles 16 at a given point in time. In fact, the communications and processing capacity of the end-point 14 may be the only limiting factors with respect to the quantity of host vehicles 16 within the system 10. Therefore, because more than one host vehicle 16 may be operating on a given portion of a road at a particular point in time, telemetry data from each of the host vehicles 16 can be aggregated and analyzed together.

A cache writer 42 writes new host vehicle 16 telemetry data packets 30 to an end-point 14 in-memory cache with the session ID as an indexed field. The cache is indexed by session ID so that telemetry data packets 30 from a particular host vehicle 16 remain associated with a particular session ID for the duration of a trip.

Figure 3:
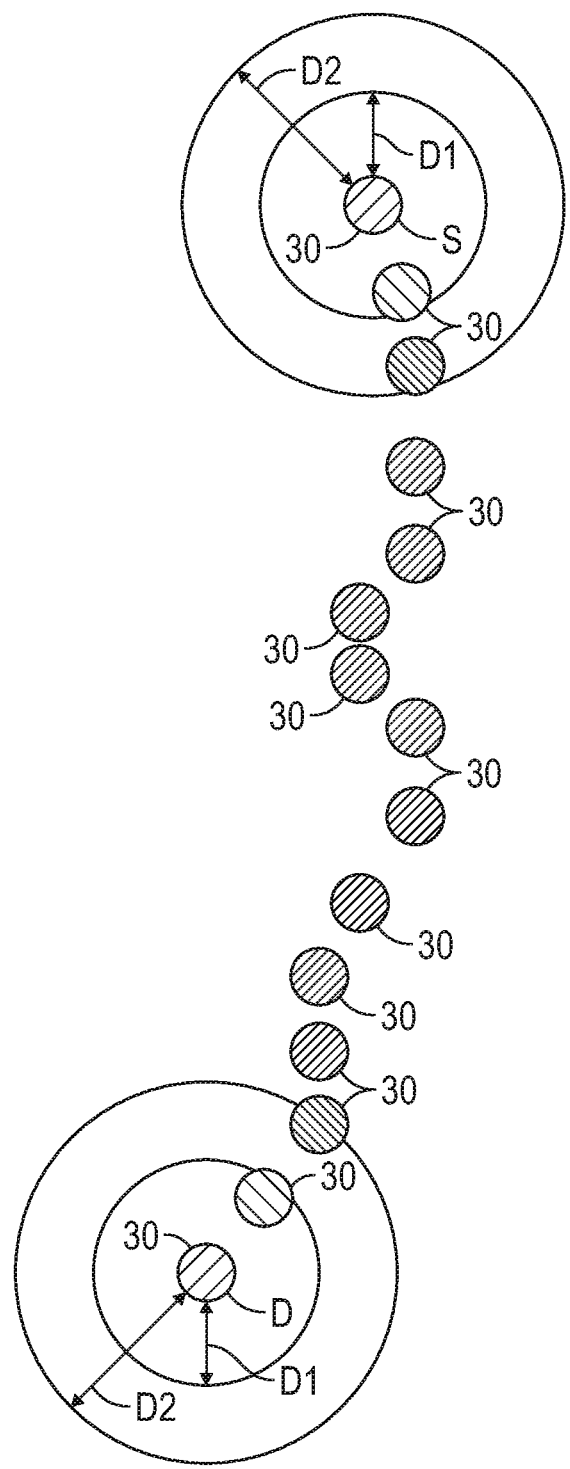
FIG. 3 is a schematic view of a trip of a host vehicle equipped with a system for real-time session-based anonymization and blurring of high resolution GPS data and depicting data packets and distances from start and end locations according to an aspect of the present disclosure.

Turning now to FIG. 3 and with continuing reference to FIGS. 1 and 2, a depiction of an exemplary host vehicle 16 trip is shown. The processor 20" queries all of the host vehicle 16 telemetry data packets 30 for the unique session ID and sequentially orders all of the host vehicle telemetry data packets 30 for the unique session ID based on time stamps. By sequentially ordering all of the telemetry data packets 30 for the unique session ID, the processor 20" can determine a start location S and an end location D of the host vehicle's 16 current trip. The start location S is determined by the first in time of the telemetry data packets 30, and the end location D is determined by the last in time of the telemetry data packets 30.

The start and end locations S, D can be used to infer a variety of personally-identifiable data, such as an operator's home address, work address, doctor's office address, or the like. Accordingly, it is important that the start and end locations S, D of each trip be at least partially obfuscated or blurred. Thus, the processor 20" executes a control logic 48 that performs distance-based start location S and end-location D blurring of the host vehicle's 16 position on a given trip. To do so, the processor 20" checks all of the telemetry data packets 30 to determine a distance of each of the data packets 30 from the start location S as determined from the first in time of the data packets 30. Likewise, the processor 20" checks all of the data packets 30 to determine a distance of each of the data packets 30 from the end location as determined from the last in time of the data packets 30. Data packets 30 within a first predetermined radial distance D1 from the start location S, and end location D are blurred or obfuscated by decreasing a GPS location precision. In several aspects, the first predetermined radial distance D1 is selected based on a variety of factors, including but not limited to: population density, host vehicle 16 speed, time interval between data packet transmissions and/or receptions, and the like. In one example, the first predetermined radial distance is between about 100 meters and about 500 meters from each of the start location S and end location D.

Within the first predetermined radial distance D1, the processor 20" executes control logic that causes the GPS location precision to be decreased by a first predetermined amount. In one example, the GPS location precision is decreased by reducing the number of GPS location digits by two. Accordingly, the GPS location precision within the first predetermined radial distance D1 is on the order of 100 meters.

As the host vehicle 16 moves farther from the start and end locations S, D, the host vehicle 16 may pass outside the first predetermined radial distance D1 and into a second predetermined radial distance D2. Within the second predetermined radial distance D2, the processor 20" executes control logic that decreases the GPS location precision by a second predetermined amount less than the first predetermined amount. That is, because the host vehicle 16 is now farther from the start and/or end locations S, D, the need to protect or obfuscate the origin or destination of the host vehicle 16 occupants is decreased. Additionally, in order to provide relevant and useful information to an aggregation of host vehicle 16 data for traffic analysis and the like, it is important that as little of the vehicle telemetry data be obfuscated or blurred as possible. Therefore, within the second predetermined radial distance D2 of the start and end locations S, D, the processor 20" may reduce the precision of the un-altered GPS data by less than in the first predetermined radial distance D1. That is, the precision of location information within the second predetermined radial distance D2 is greater than the precision of the location information within the first predetermined radial distance D1. In an example, the GPS location precision within the second predetermined radial distance D2 is decreased by a single GPS location digit. Accordingly, GPS location precision within the second predetermined radial distance D2 is on the order of 10 meters. More generally, GPS location precision is lowered by decreasing a number or quantity of numerical location digits or decimal places in the GPS location information by a predetermined amount.

It should be appreciated that the blurring or obfuscating processes described above are exemplary, and other means of carrying out such location obfuscation or blurring are contemplated herein. Likewise, while only a first and a second predetermined radial distance D1, D2 are described above, it should be appreciated that any number of radial distances from a start and end location S, D may be calculated for a variety of purposes, including additional areas of GPS precision blurring or obfuscation.

Once the location information within the host vehicle 16 telemetry data packets 30 has been blurred or obfuscated as described above, the data packets 30 corresponding to the session ID are written to disk or persistent database 50 where the data packets 30 may be queried by offline analytics applications 52, such as historical traffic analysis, route efficiency analysis, road condition analysis, and the like.

Additionally, the control logic 48 removes session IDs from the cache of the session anonymizer 36 by a session eviction algorithm. In several aspects, the session eviction algorithm or "reaper" deletes keys associating a host vehicle's 16 telemetry data packets 30 with a unique session ID for the current host vehicle 16 trip after a predetermined period of time. More specifically, upon receiving a trip session ID to evict, the session eviction algorithm of the control logic 48 will query an in-memory cache 46 for all data packets 30 with the current session ID for the host vehicle, and will order them by their timestamp. In order to prevent unnecessary or improper deletion of the keys, the predetermined period of time may be in the range of about 0 to about 10 minutes, from about 2 to about 7 minutes, or about 5 minutes in length. Broadly speaking, the predetermined period of time is selected to allow for the host vehicle 16 to re-connect with the remote end-point 14 if the host vehicle 16 is in an area with poor reception or high signal interference, such as a tunnel, a city with tall buildings, or the like. Accordingly, the predetermined period of time allows the host vehicle 16 to update its telemetry information while accounting for potential data packet transmission issues. Furthermore, the predetermined period of time is optimally selected to correctly ascertain an end-point of the current trip for a given host vehicle 16. The session anonymizer 36 then sends eviction messages to a queue 54 once the predetermined period of time has elapsed after a key-off packet is received for the current session ID. That is, session IDs for a current host vehicle 16 trip are expunged from the system 10 after a key-off packet is received and/or the predetermined period of time has elapsed. Moreover, once the current host vehicle 16 trip has ended, not only is the session ID expunged, but the real-time host vehicle telemetry data packets from the in-memory cache are expunged or deleted as well.

Figure 4:
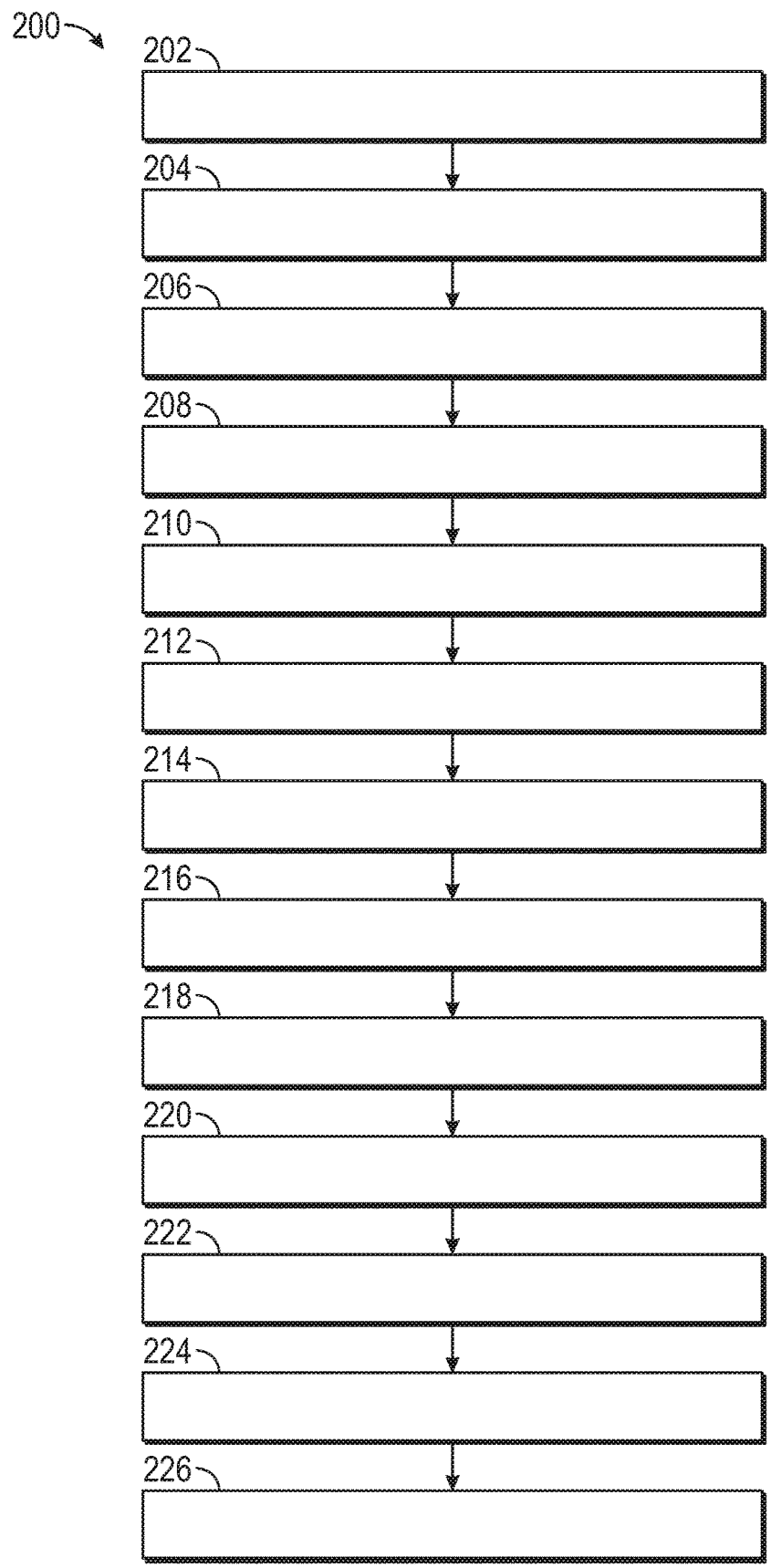
FIG. 4 is a flow chart depicting a method of using a system for real-time session-based anonymization and blurring of high resolution GPS data.

Turning now to FIG. 4, and with continuing reference to FIGS. 1-3, a method 200 for anonymizing motor vehicle position information is shown. The method 200 begins at block 202 where the GPS module 18 collects real-time host vehicle 16 telemetry data packets 30 from GPS satellites external to the host vehicle 16. At block 204, the control module 28 disposed within the host vehicle 16 then collects the real-time host vehicle telemetry data packets 30 from the GPS module 18 and continuously and periodically communicates the data packets 30 to the remote end-point 14 via a wireless communications process. At block 206, the remote end-point 14 continuously and periodically receives the real-time host vehicle telemetry data packets 30 from the control module 28. The data packets 30 include information about the host vehicle 16 including a vehicle identification number (VIN), a host vehicle speed, a host vehicle bearing, a host vehicle altitude, a host vehicle ignition position, and other such parameters.

At block 208, the remote end-point 14 classifies the real-time host vehicle telemetry data packets 30 into start of trip, end of trip, and latest value of current trip classifications. In several aspects, the start of trip and end of trip classifications are determined based on an ignition on and ignition off packet as described hereinabove. The latest value of current trip classification is based on a sequential ordering of the data packets 30 as they are received by the remote end-point 14 from a particular host vehicle 16.

At block 210, the remote end-point performs session-based anonymization of the real-time host vehicle telemetry data packets 30, including: removing the host vehicle's 16 VIN and replacing the VIN with a unique session ID for the current host vehicle 16 trip, generating keys that associate the host vehicle with the unique session ID for the current host vehicle 16 trip, and associating newly received real-time host vehicle telemetry data packets 30 with the unique session ID for the current host vehicle 16 trip.

At block 212 the method 200 queries all of the real-time host vehicle telemetry data packets 30 for the unique session ID and sequentially orders all of the data packets 30 based on the unique session ID time stamps. At block 214, from the sequentially ordered data packets 30, the method 200 determines a start location S from the first in time of real-time host vehicle telemetry data packets 30. Likewise, at block 214 the method 200 determines an end location D based on a last in time of the real-time vehicle telemetry data packets 30 and/or a key-off ignition position. At block 216, the method 200 performs distance-based start location S and end location D blurring of host vehicle 16 GPS position data. Specifically, the method 200 checks all of the real-time vehicle telemetry data packets 30 to determine a current distance from the start location S, and checks all of the real-time host vehicle telemetry data packets 30 to determine a current distance from the end location D.

At block 218, the method 200 performs distance-based start location S and end location D blurring of the host vehicle 16 position. That is, the method 200 decreases the precision of location information in each of the real-time host vehicle telemetry data packets 30 when the current distance of the host vehicle 16 to the start location S is within a first predetermined radial distance of the start location S. Likewise, the method decreases a precision of location information in each of the real-time host vehicle telemetry data packets 30 when the current distance of the host vehicle 16 to the end location is within the first predetermined radial distance of the end location.

At block 220, the method decreases a precision of location information in each of the real-time host vehicle telemetry data packets 30 when the current distance from host vehicle 16 to the start location S is within a second predetermined radial distance of the start location. Similarly, the method decreases a precision of location information in each of the real-time host vehicle telemetry data packets 30 when the current distance from the host vehicle 16 to the end location is within the second predetermined radial distance of the end location. In several aspects, the first predetermined radial distance is smaller than the second predetermined radial distance, and the precision of location information within the second predetermined radial distance is set to be greater than the precision of location information within the first predetermined radial distance.

At block 222, the method 200 deletes keys associating the real-time host vehicle telemetry data packets 30 with the unique session ID for the current host vehicle 16 after a predetermined amount of time and writes the real-time host vehicle telemetry data packets 30 to an end-point in memory cache 46 with the unique session ID as an indexed field.

At block 224, the method 200 writes the real-time host vehicle telemetry data packets 30 to a persistent database 50 once the session-based anonymization of the real-time host vehicle telemetry data packets 30 has been performed, and once the distance-based start location and end location blurring has been performed. Subsequently, at block 224, the method 200 removes session IDs from the in-memory cache 46 of the session anonym izer 36 by a session eviction algorithm. In several aspects, the session eviction algorithm or "reaper" deletes keys associating a host vehicle's 16 telemetry data packets 30 with a unique session ID for the current host vehicle 16 trip after a predetermined period of time. More specifically, upon receiving a trip session ID to evict, the session eviction algorithm will query an in-memory cache 46 for all data packets 30 with the current session ID for the host vehicle, and will order them by their timestamp. In order to prevent unnecessary or improper deletion of the keys, the predetermined period of time may be in the range of about 0 to about 10 minutes, from about 2 to about 7 minutes, or about 5 minutes in length. Broadly speaking, the predetermined period of time is selected to allow for the host vehicle 16 to re-connect with the remote end-point 14 if the host vehicle 16 is in an area with poor reception or high signal interference, such as a tunnel, a city with tall buildings, or the like. Accordingly, the predetermined period of time allows the host vehicle 16 to update its telemetry information while accounting for potential data packet transmission issues. Furthermore, the predetermined period of time is optimally selected to correctly ascertain an end-point of the current trip for a given host vehicle 16. The session anonymizer 36 then sends eviction messages to a queue 54 once the predetermined period of time has elapsed after a key-off packet is received for the current session ID. That is, session IDs for a current host vehicle 16 trip are expunged from the system 10 after a key-off packet is received and/or the predetermined period of time has elapsed. Moreover, once the current host vehicle 16 trip has ended, not only is the session ID expunged, but the real-time host vehicle telemetry data packets from the in-memory cache are expunged or deleted as well.

At block 226, the method ends and returns to block 202 when the next key-on packet is sent from the ignition (not specifically shown) of the host vehicle 16 to the control module 28 as an operator of the host vehicle 16 turns on the ignition of the host vehicle 16.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for anonymizing motor vehicle position information, the system comprising:
   a global positioning system (GPS) module disposed within a host vehicle;
   a control module disposed within the host vehicle and in electronic communication with the GPS module, the control module having a memory for storing control logic and a processor configured to execute the control logic, the control logic comprising:
      a first control logic for collecting real-time host vehicle telemetry data packets from the GPS module, wherein the real-time host vehicle telemetry data packets further comprise:
         a host vehicle identification number (VIN);
         a host vehicle speed;
         a host vehicle bearing;
         a host vehicle altitude; and
         a host vehicle ignition position; and
      a second control logic for continuously wirelessly communicating the real-time host vehicle telemetry data packets;
   a remote end-point in wireless electronic communication with the control module, the remote end-point having a memory for storing end-point control logic and a processor configured to execute the end-point control logic, the end-point control logic comprising:
      a first end-point control logic for continuously receiving the real-time host vehicle telemetry data packets from the control module;
      a second end-point control logic for performing session-based anonymization of the real-time host vehicle telemetry data packets, wherein the second end-point control logic further comprises:
         a control logic for removing the host vehicle VIN and replacing the VIN with a unique session identifier (ID) for a current host vehicle trip;
         a control logic for generating keys that associate the host vehicle with the unique session ID for the current host vehicle trip; and
         a control logic for associating new real-time host vehicle telemetry data packets with the unique session ID for the current host vehicle trip;
      a third end-point control logic for performing distance-based start location and end location blurring of host vehicle position, wherein the third end-point control logic further comprises:
         control logic for determining a start location based on a first in time of the real-time host vehicle telemetry data packets, and for determining an end location based on a last in time of the real-time host vehicle telemetry data packets;
         control logic for checking all of the real-time host vehicle telemetry data packets to determine a current distance from the start location; and
         control logic for checking all of the real-time host vehicle telemetry data packets to determine a current distance from the end location; and
      a fourth end-point control logic for writing the real-time host vehicle telemetry data packets to a persistent database once the second end-point control logic and the third end-point control logic have been executed.

2. The system of claim 1 wherein the second control logic further comprises: a control logic for continuously communicating the real-time host vehicle telemetry data packets at intervals of approximately 3 seconds.

3. The system of claim 1 wherein the first end-point control logic further comprises: a control logic for classifying the real-time host vehicle telemetry data packets into: start of trip, end of trip, and latest value of current trip classifications.

4. The system of claim 1 wherein the second end-point control logic further comprises:
a control logic for deleting keys associating the real-time host vehicle telemetry data packets with the unique session ID for the current host vehicle trip after a predetermined period of time; and
a control logic for expunging the session ID after a key-off packet is received or the predetermined period of time has elapsed.

5. The system of claim 1 wherein the end-point control logic further comprises:
a fifth end-point control logic for writing the real-time host vehicle telemetry data packets to an end-point in-memory cache with the unique session ID as an indexed field; and for deleting the real-time host vehicle telemetry data packets from the in-memory cache once a current trip has ended.

6. The system of claim 1 wherein the end-point control logic further comprises:
a sixth end-point control logic for querying all of the real-time host vehicle telemetry data packets for the unique session ID; and
a seventh end-point control logic for sequentially ordering all of the real-time host vehicle telemetry data packets for the unique session ID based on time stamps.

7. The system of claim 1 wherein the third end-point control logic further comprises:
a control logic for decreasing a precision of location information in each of the real-time host vehicle telemetry data packets within a first predetermined radial distance of the start location;
a control logic for decreasing a precision of location information in each of the real-time host vehicle telemetry data packets within the first predetermined radial distance of the end location;
a control logic for decreasing a precision of location information in each of the real-time host vehicle telemetry data packets within a second predetermined radial distance of the start location; and
a control logic for decreasing a precision of location information in each of the real-time host vehicle telemetry data packets within the second predetermined radial distance of the end location, wherein the first predetermined radial distance is smaller than the second predetermined radial distance.

8. The system of claim 7 wherein the third end-point control logic further comprises:
control logic for decreasing GPS precision by a predetermined quantity of numerical location digits or decimal places, and
wherein the precision of location information within the second predetermined radial distance is greater than the precision of location information within the first predetermined radial distance.

9. A method for anonymizing motor vehicle position information, the method comprising:
collecting real-time host vehicle telemetry data packets from a global positioning system (GPS) module disposed within a host vehicle;
utilizing a control module disposed within the host vehicle and in electronic communication with the GPS module, the control module having a memory for storing control logic and a processor configured to execute the control logic;
collecting real-time host vehicle telemetry data packets from the GPS module including:
collecting a host vehicle identification number (VIN);
collecting a host vehicle speed;
collecting a host vehicle bearing;
collecting a host vehicle altitude; and
collecting a host vehicle ignition position; and
continuously wirelessly communicating the real-time host vehicle telemetry data packets;
utilizing a remote end-point in wireless electronic communication with the control module, the remote end-point having a memory for storing end-point control logic and a processor configured to execute the end-point control logic;
continuously receiving the real-time host vehicle telemetry data packets from the control module;
performing session-based anonymization of the real-time host vehicle telemetry data packets, including:
removing the host vehicle VIN and replacing the VIN with a unique session identifier (ID) for a current host vehicle trip;
generating keys that associate the host vehicle with the unique session ID for the current host vehicle trip; and
associating new real-time host vehicle telemetry data packets with the unique session ID for the current host vehicle trip;
performing distance-based start location and end location blurring of host vehicle position;
determining a start location based on a first in time of the real-time host vehicle telemetry data packets, and for determining an end location, different from the start location, based on a last in time of the real-time host vehicle telemetry data packets; and
writing the real-time host vehicle telemetry data packets to a persistent database once the session-based anonymization of the real-time host vehicle telemetry data packets has been performed, and once the distance-based start location and end location blurring has been performed.

10. The method of claim 9 further comprising continuously communicating the real-time host vehicle telemetry data packets at intervals of approximately 3 seconds.

11. The method of claim 9 further comprising classifying the real-time host vehicle telemetry data packets into: start of trip, end of trip, and latest value of current trip classifications.

12. The method of claim 9 wherein performing session-based anonymization of the real-time host vehicle telemetry data packets further comprises:
deleting keys associating the real-time host vehicle telemetry data packets with the unique session ID for the current host vehicle trip after a predetermined period of time or after a key-off packet has been received;
writing the real-time host vehicle telemetry data packets to an end-point in-memory cache with the unique session ID as an indexed field; and
deleting the real-time host vehicle telemetry data packets from the in-memory cache once a current trip has ended.

13. The method of claim 9 further comprising:
querying all of the real-time host vehicle telemetry data packets for the unique session ID;

sequentially ordering all of the real-time host vehicle telemetry data packets for the unique session ID based on time stamps;

checking all of the real-time host vehicle telemetry data packets to determine a current distance from the start location; and checking all of the real-time host vehicle telemetry data packets to determine a current distance from the end location.

14. The method of claim 13 further comprising:

decreasing a precision of location information in each of the real-time host vehicle telemetry data packets when the distance from the start location is within a first predetermined radial distance of the start location;

decreasing a precision of location information in each of the real-time host vehicle telemetry data packets when the distance from the end location is within the first predetermined radial distance of the end location;

decreasing a precision of location information in each of the real-time host vehicle telemetry data packets when the distance from the start location is within a second predetermined radial distance of the start location;

decreasing a precision of location information in each of the real-time host vehicle telemetry data packets when the distance from the end location is within the second predetermined radial distance of the end location; and wherein the first predetermined radial distance is smaller than the second predetermined radial distance, and wherein decreasing a precision of location information in each of the host vehicle telemetry data packets within the first predetermined radial distance and within the second predetermined radial distance further comprises:

decreasing GPS precision by a predetermined quantity of numerical location digits or decimal places, wherein the precision of location information within the second predetermined radial distance is greater than the precision of location information within the first predetermined radial distance.

15. A method for anonymizing motor vehicle position information, the method comprising:

collecting real-time host vehicle telemetry data packets, including collecting a host vehicle identification number (VIN) from a global positioning system (GPS) module disposed within a host vehicle;

utilizing a control module disposed within the host vehicle and in electronic communication with the GPS module, the control module having a memory for storing control logic and a processor configured to execute the control logic;

continuously wirelessly communicating the real-time host vehicle telemetry data packets;

utilizing a remote end-point in wireless communication with the control module, the remote end-point continuously receiving the real-time host vehicle telemetry data packets from the control module, the remote end-point having a memory for storing end-point control logic and a processor configured to execute the end-point control logic;

performing session-based anonymization of the real-time host vehicle telemetry data packets, including:

removing the host vehicle VIN and replacing the VIN with a unique session identifier (ID) for a current host vehicle trip;

associating new host vehicle telemetry data packets with the unique session ID for the current host vehicle trip;

deleting keys associating the host vehicle telemetry data packets with the unique session ID for the current host vehicle trip after a predetermined period of time or after a key-off packet has been received;

writing the host vehicle telemetry data packets to an end-point in-memory cache with the unique session ID as an indexed field; and performing distance-based start location and end location blurring of host vehicle position, including:

querying all of the host vehicle telemetry data packets for the unique session ID;

sequentially ordering all of the host vehicle telemetry data packets for the unique session ID based on time stamps;

checking all of the data packets to determine a distance from a first in time of the host vehicle telemetry data packets; and checking all of the data packets to determine a distance from a last in time of the host vehicle telemetry data packets;

decreasing a precision of location information in each of the host vehicle telemetry data packets within a first predetermined radial distance of a location of the first in time of the host vehicle telemetry data packets by decreasing GPS precision by a predetermined quantity of numerical location digits or decimal places;

deleting the real-time host vehicle telemetry data packets from the in-memory cache once a current trip has ended; and wherein checking all of the data packets to determine a distance from a last in time of the host vehicle telemetry data packets further comprises:

decreasing a precision of location information in each of the host vehicle telemetry data packets within a second predetermined radial distance of a location of the last in time of the host vehicle telemetry data packets by decreasing GPS precision by a predetermined quantity of numerical location digits or decimal places, wherein the precision of location information within the second predetermined radial distance is greater than the precision of location information within the first predetermined radial distance, wherein the first predetermined radial distance is smaller than the second predetermined radial distance.

* * * * *